(12) United States Patent
Yadav et al.

(10) Patent No.: US 11,755,425 B1
(45) Date of Patent: Sep. 12, 2023

(54) METHODS AND SYSTEMS FOR SYNCHRONOUS DISTRIBUTED DATA BACKUP AND METADATA AGGREGATION

(71) Applicant: Dell Products L.P., Round Rock, TX (US)

(72) Inventors: Sunil Yadav, Bangalore (IN); Manish Sharma, Bangalore (IN); Aaditya Bansal, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 31 days.

(21) Appl. No.: 17/722,898

(22) Filed: Apr. 18, 2022

(51) Int. Cl.
*G06F 11/00* (2006.01)
*G06F 11/14* (2006.01)

(52) U.S. Cl.
CPC ...... *G06F 11/1464* (2013.01); *G06F 11/1435* (2013.01); *G06F 11/1451* (2013.01); *G06F 11/1469* (2013.01)

(58) Field of Classification Search
CPC ............. G06F 11/1464; G06F 11/1435; G06F 11/1451
See application file for complete search history.

(56) References Cited

U.S. PATENT DOCUMENTS

2003/0191916 A1* 10/2003 McBrearty .......... G06F 11/1464
  711/112

* cited by examiner

*Primary Examiner* — Jae U Yu
(74) *Attorney, Agent, or Firm* — Chamberlain, Hrdlicka, White, Williams & Aughtry (57) ABSTRACT

A method for generating data backups, that includes receiving, by a local backup manager executing on a local storage server, a command to initiate a backup process for a virtual data pool, and in response to receiving the command, identifying a plurality of locations pointing to a plurality of data, respectively, making a first determination that a first location points to a remote data stored on a remote storage server, in response to the first determination, sending a second command, to the remote storage server, to generate a remote backup data of the remote data, making a second determination that a second location points to a local data stored on the local storage server, and in response to the second determination, generating a local backup data of the local data, where the plurality of data backups includes the remote backup data and the local backup data.

20 Claims, 4 Drawing Sheets

METHODS AND SYSTEMS FOR SYNCHRONOUS DISTRIBUTED DATA BACKUP AND METADATA AGGREGATION

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

In general, embodiments of the invention relate to systems and methods for generating backup data for data (i.e., underlying data) stored on multiple storage servers, without transferring the underlying data to a centralized server. In traditional data storage environments, a backup process may be initiated for data that is residing on multiple storage servers separated by a wide area network (e.g., the Internet). In such instances, the data to be backed up is first transferred to a single server, where backup data (e.g., a snapshot, image, archive, copy, etc.) and backup metadata is generated for that data. However, when the data is large, transferring that data between storage servers over a network (particularly the Internet) can be comparatively slow and expensive.

As disclosed herein, a method is provided to generate backup data and backup metadata on each storage server separately. Thus, the backup data is generated within each storage server, without transferring the underlying data across a network. To perform this method, a backup process is initiated from a "local storage server" that identifies the location(s) of the data to be backed up. If any part of the data resides on a "remote storage server", that remote storage server is sent a command (from the local storage server) to begin generating backup data of the underlying data identified on that remote storage server. Accordingly, data residing on the local storage server and one or more remote storage servers may be backed up synchronously on each storage server separately.

In one or more embodiments of the invention, when completed, the backup data remains on the storage server where the underlying data resides (where the backup data was generated). However, the (smaller) backup metadata may be copied form each storage server and merged into a single "combined metadata" for that backup. Further, the combined metadata may be used as an index to quickly search, identify, and locate files in the backup data. The combined metadata may be stored on a separate server (e.g., a metadata server) that is used to track each backup (via the combine metadata generated for each backup) and provide the ability to restore the underlying data using the backup data.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

As used herein, the word 'data' is treated as an "uncountable" singular noun (and not as the plural form of the singular noun 'datum'). Accordingly, throughout the application, 'data' is paired with a singular verb when written (e.g., "data is"). However, this usage should not be interpreted to redefine 'data' to mean only a single bit of information. Rather, as used herein, 'data' means any one or more bits of information that are logically and/or physically grouped. Further, 'data' may be treated as a plural if context provides the existence of multiple 'data' (e.g., "two data are combined").

Figure 1:
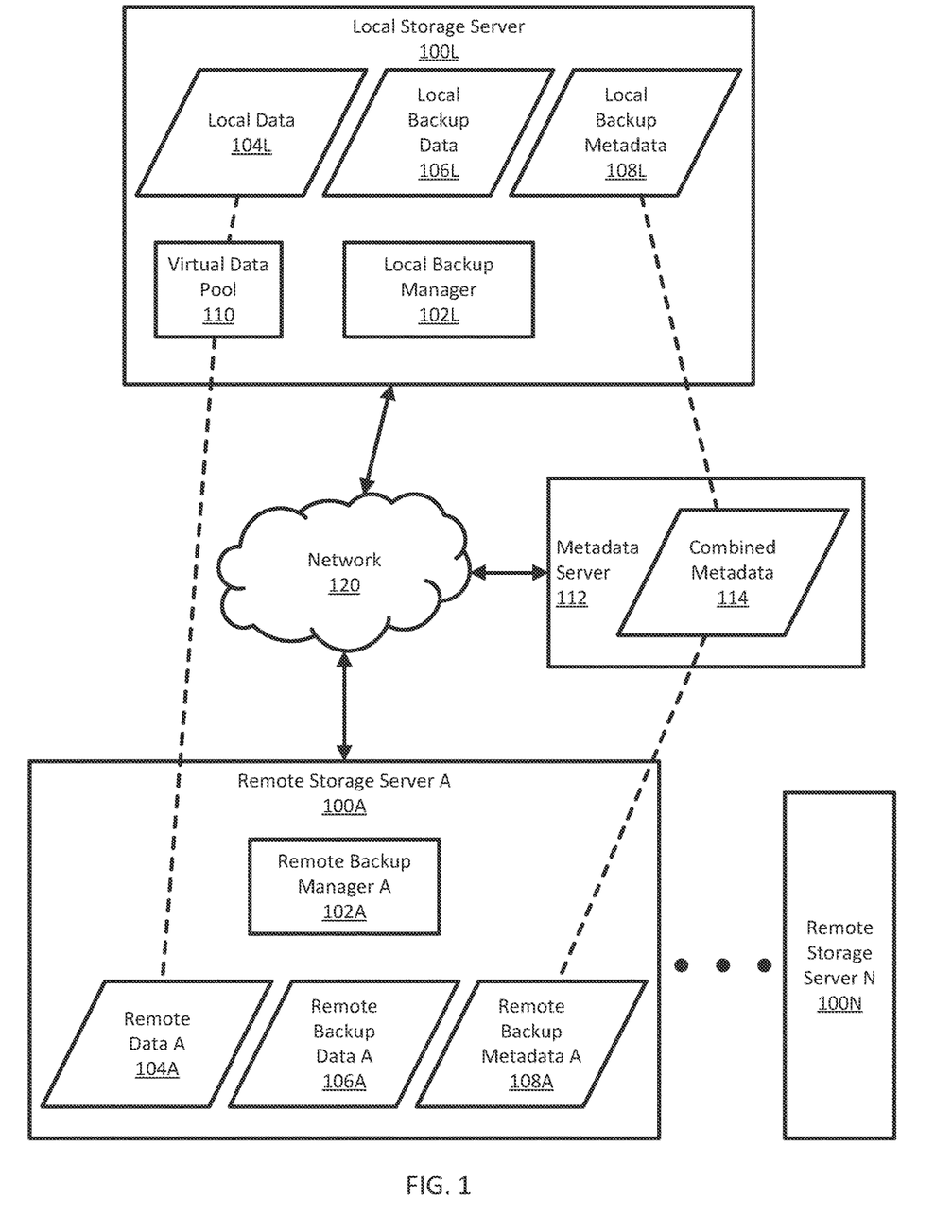
FIG. 1 shows a diagram of system, in accordance with one or more embodiments of the invention.

FIG. 1 shows a diagram of system, in accordance with one or more embodiments of the invention. The system may include one or more storage server(s) (e.g., local storage server (100L), remote storage server A (100A), remote storage server N (100N)), a metadata server (e.g., metadata server (112)), and/or a network (e.g., network (120)) operatively connecting those components. Each of these components is described below.

In one or more embodiments, a computing device is hardware that includes one or more processor(s), memory (volatile and/or non-volatile), persistent storage, internal physical interface(s) (e.g., serial advanced technology attachment (SATA) ports, peripheral component interconnect (PCI) ports, M.2 ports, etc.), external physical interface(s) (e.g., universal serial bus (USB) ports, recommended standard (RS) serial ports, audio/visual ports, etc.), communication interface(s) (e.g., network ports, small form-factor pluggable (SFP) ports, wireless network devices, etc.), input and output device(s) (e.g., human interface devices), or any combination thereof. Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions.

Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities.

In one or more embodiments of the invention, a storage server (100) is a computing device. Further, a storage server (100) may include one or more forms of data (e.g., data (104), backup data (106), backup metadata (108)), a virtual data pool (e.g., virtual data pool (110)), and a backup manager (e.g., backup manager (102)). A storage server (100) may be considered "local" or "remote" depending on the perspective of the operations performed by that storage server. As used herein, many operations will be described from the perspective of the "local" storage server (100L) in relation to one or more "remote" storage servers (100A, 100N). However, any of the disclosed storage servers (100) may be configured to perform the disclosed methods and therefore may be considered "local" when performing those operations. Similarly, each component of a storage server (100) (e.g., data (104), backup data (106), backup metadata (108), backup manager (102), and virtual data pool (110)) may be considered "local" or "remote" depending on the storage server (100) in which those components reside (e.g., a "local" storage server (100L) includes "local" data (104L) whereas a "remote" storage server (100A) includes "remote" data (104A)).

In one or more embodiments of the invention, data (104) is digital information stored on a computing device (i.e., in a storage device and/or in memory). In one or more embodiments of the invention, data (104) may include one or more individual data components (e.g., blocks, files, records, etc.) that may be separately read, copied, erased, and/or otherwise modified. One of ordinary skill in the art, having the benefit of this detailed description, would appreciate what data is and how data is used on computing devices.

In one or more embodiments of the invention, backup data (106) is copy of the data (104) and may include additional data about the system (e.g., metadata about the data (104), data describing the components of a storage server (100), data describing a program and/or process executing on a storage server (100), etc.). Non-limiting examples of backup (106) data include a snapshot, image, archive, or copy of the data. In one or more embodiments, backup data (106) may be generated from data (106) referenced in a virtual data pool (110) (pointing to individual data components stored on one or more storage server(s) (100)).

In one or more embodiments of the invention, backup metadata (108) is data describing properties of associated backup data (106) and, indirectly, the data (104) from which the backup data (108) was generated. The backup metadata (108) may include the locations (e.g., the devices, paths, addresses, etc.) of the where the backup data (106) was copied from (i.e., the locations of the data (104) from which the backup data (108) was generated), the time the backup data (106) was created, the size of the backup data (106), a unique identifier associated with the backup data (106), an identifier of the host storage server (100), one or more hashes of the backup data (106), attributes of the backup data (106), and/or any other information relevant to the data (104) and/or backup data (106). In one or more embodiments of the invention, the backup metadata (108) may provide the data locations relative to the local storage server (100L). As a non-limiting example, local backup metadata (108L) may provide a locally executable path to local data (104L) that only the local storage server (100L) may use, whereas remote backup metadata (108A) may provide a network-addressable path to remote data (104A) that the local storage server (100L) may use to access the remote data (104A) via network (120). As another non-limiting example, any or all backup metadata (108) may include locations of data (104) that are universally accessible by any device with privileged access, regardless of whether that data (104) is "local" or "remote" (e.g., using network paths, even when the data is stored locally).

In one or more embodiments of the invention, a virtual data pool (110) is a collection of virtualized data (e.g., pointers/paths to local data, symbolic links to remote data, etc.) where the underlying data (104) exists on one or more storage server(s) (100). A virtual data pool (110) may be presented to software executing on the storage server (100) as a single storage device and/or volume. Software executing on the storage server (100) may be able to read, write, and/or modify data in the virtual data pool (110) without consideration of the underlying storage device(s) (and storage server(s) (100)) on which the data (104) is residing.

In one or more embodiments of the invention, a virtual data pool (110) may include virtual data that points to data (104) existing on a non-volatile storage device, a volatile storage device, or both. Further, similar to how data (104) includes one or more individual data components, the virtualized data of the virtual data pool (110) may point to one or more individual data components. In one or more embodiments of the invention, a virtual data pool (110) may be a collection of virtualized data that is related to specific software (or set of software) executing on the storage server (100) (e.g., all data used, created, and/or modified by that software). In one or more embodiments of the invention, a virtual data pool (110) may be a collection of virtualized data that is related to a specific user of a computing device.

In one or more embodiments of the invention, backup manager (102) is software, executing on a storage server (100), that is configured to generate (i.e., create, write), maintain, and/or otherwise modify backup data (106) and backup metadata (108). A backup manager (102) may receive commands and/or requests (e.g., from a user, from another backup manager), and in response to receiving those requests, generate backup data (106) and backup metadata (108). A backup manager may perform some or all of the method shown in FIG. 3 and FIG. 4.

In one or more embodiments of the invention, a metadata server (112) is a storage server (100) that stores combined metadata (114) and/or any other type of data. Additional details regarding the combined metadata (114) may be found in the description of FIG. 2.

In one or more embodiments of the invention, a network (120) is a collection of connected network devices (e.g., storage server(s) (100), metadata server (112)) that allow for the communication of data from one network device to other network devices, or the sharing of resources among network devices. Examples of a network (e.g., network (120)) include, but are not limited to, a local area network (LAN), a wide area network (WAN) (e.g., the Internet), a mobile network, or any other type of network that allows for the communication of data and sharing of resources among network devices and/or devices operatively connected to the network (120). One of ordinary skill in the art, having the benefit of this detailed description, would appreciate that a network is a collection of operatively connected devices that enables communication between those devices.

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
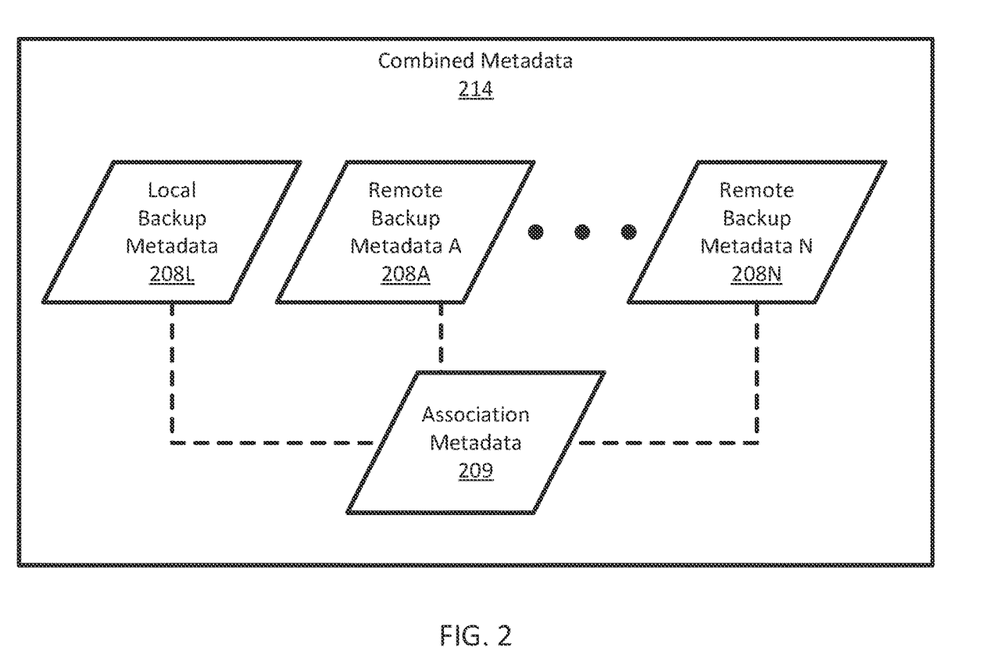
FIG. 2 shows a diagram of combined metadata, in accordance with one or more embodiments of the invention.

FIG. 2 shows a diagram of combined metadata, in accordance with one or more embodiments of the invention. The combined metadata (e.g., combined metadata (214)) may include one or more types of backup metadata (208) (e.g., local backup metadata (208L), remote backup metadata A (208A), remote backup metadata N (208N)) and/or association metadata (e.g., association metadata (209)). The backup metadata (208) and association metadata (209) in the combined metadata (214) may relate to single instance of a backup data. As a non-limiting example, upon initiation to generate a backup of data existing on two or more storage servers, the backup metadata (208) from each storage server may be combined into a single combined metadata (214) that is exclusively associated with that overall backup operation. Similarly named and/or similarly numbered components of FIG. 2 have all of the same properties as discussed in the description of FIG. 1. Accordingly, only additional components are described below.

In one or more embodiments of the invention, association metadata (209) is metadata that describes how two or more backup metadata (208) relate to each other and/or describe the data from which the backup data was generated. As a non-limiting example, association metadata (209) may include a list (e.g., a series of unique identifiers) of each backup metadata (208) generated for a single backup process (all of the backup metadata (208) in the same combined metadata (214)), the storage servers where each of the backup data is stored, an index of the files in the backup data and their corresponding backup metadata (208).

While FIG. 2 shows a specific configuration of a system, other configurations may be used without departing from the scope of the invention. Accordingly, embodiments disclosed herein should not be limited to the configuration of devices and/or components shown in FIG. 2.

Figure 3:
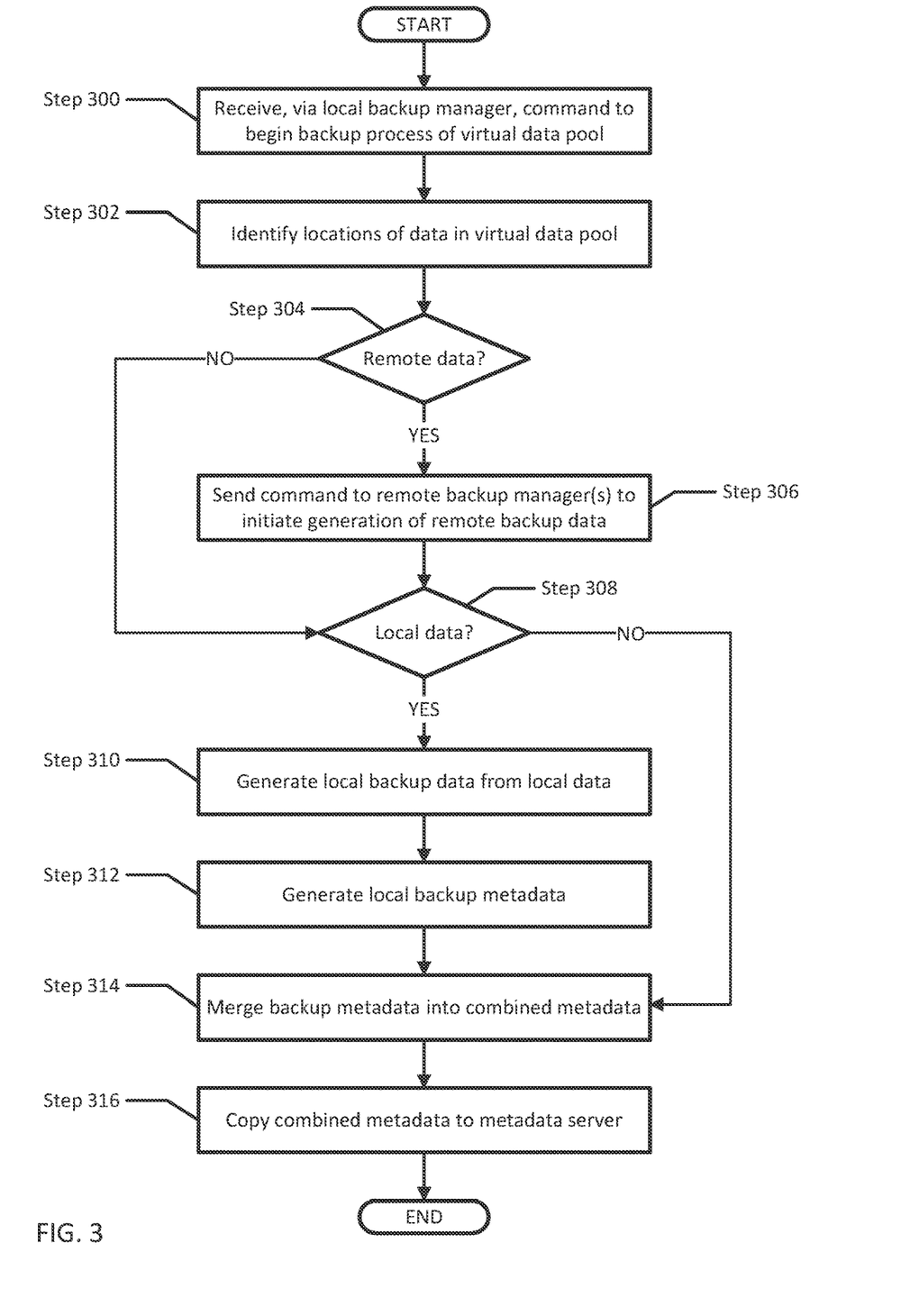
FIG. 3 shows a flowchart of a method of generating backup data and backup metadata, in accordance with one or more embodiments of the invention.

FIG. 3 shows a flowchart of a method of generating backup data and backup metadata, in accordance with one or more embodiments of the invention. All or a portion of the method shown may be performed by one or more components of the local storage server. However, another component of the system may perform this method without departing from the invention. While the various steps in this flowchart are presented and described sequentially, one of ordinary skill in the relevant art will appreciate that some or all of the steps may be executed in different orders, combined, or omitted, and some or all steps may be executed in parallel.

In Step 300, the local backup manager of the local storage server receives a command (and/or request) to begin a backup process of a virtual data pool. The command may be received from a user of the local storage server, the command may be generated and sent automatically (e.g., scheduled by another program), and/or the local backup manager may initiate the process automatically (e.g., on a schedule). Although the command may only specify the virtual data pool (a collection of pointers, links, and paths), the local backup manager initiates a backup of the underlying data referenced by the virtual data pool and not merely a backup of the virtualized data.

In Step 302, the local backup manager identifies the physical locations of the data referenced in the virtual data pool. As discussed in the description of FIG. 1, the virtual data pool includes pointers, paths, and/or links to individual data components (e.g., files) of the underlying data. Each individual data component may be stored on the local storage server or may be stored on a remote storage server.

In Step 304, the local backup manager makes a determination as to whether the virtual data pool references any data stored on a remote storage server. In one or more embodiments of the invention, the local backup manager makes the determination based on whether any of the individual data components of the virtual data pool point to data stored on a remote storage server. Non-limiting examples of virtual data pointing to data stored on a remote storage server include (i) a symbolic link that points to a remote storage server, (ii) a network-addressable path to a storage server (other than the local storage server), and (iii) a path to a virtually mounted directory that redirects to a non-locally attached device. If the virtual data pool points to individual data components that are located on one or more remote storage server (Step 304-YES), the process proceeds to Step 306. If the virtual data pool does not point to any individual data components that are located on a remote storage server (Step 304-NO), the process proceeds to Step 308.

In Step 306, the local backup manager sends a command to each remote storage server (and/or the remote backup manager executing thereon) to initiate the generation of remote backup data for the individual data components (of the virtual data pool) residing on that remote storage server. In one or more embodiments of the invention, the local backup manager sends a command to initiate generation of a remote backup data to each remote storage server that was identified (in Step 304) as storing individual data components of the virtual data pool. Further, the command sent to the remote storage server (and/or the remote backup manager executing thereon) may include the individual data components which are to be backed up. In response to receiving the request to initiate generation of remote backup data, the remote backup manager generates the remote backup data and remote backup metadata in a method similar to how the local storage server generates local backup data and local backup metadata (as discussed in Step 310 and Step 312).

In Step 308, the local backup manager makes a determination as to whether the virtual data pool references any data stored on the local storage server. In one or more embodiments of the invention, the local backup manager makes the determination based on whether any of the individual data components of the virtual data pool point to data stored on the local storage server. Non-limiting examples of virtual data pointing to data stored on the local storage server include (i) a symbolic link that points to the local storage server, (ii) a network-addressable path that matches the network address of the local storage server, (iii) a path to a virtually mounted directory that redirects to locally attached device, and (iv) a network-addressable path that uses a loopback address (e.g., 127.0.0.1). If the virtual data pool points to individual data components that are located on the local storage server (Step 308-YES), the process proceeds to Step 310. If the virtual data pool does not point to any individual data components that are located on the local storage server (Step 308-NO), the process proceeds to Step 314.

In Step 310, the local backup manager generates local backup data for the individual data components (of the virtual data pool) residing on the local storage server. The local backup data (and backup data, generally) may be a snapshot, image, archive, or copy of the individual data components. The local backup data may be generated and stored separately (e.g., on a separate partition, drive, virtual data pool, etc.) than the other data stored on the local storage server.

In Step 312, the local backup manager generates the local backup metadata for the local backup data. Generating the local backup metadata may include generating a unique identifier associated with the local backup data and storing the unique identifier in the local backup metadata (in addition to any of the other components of the backup metadata described in FIG. 1).

In Step 314, the local backup manager merges the backup metadata (generated by each storage server that generated backup data) into a combined metadata. As discussed in the description of FIG. 2, the combined metadata may include the local backup metadata (if applicable) and one or more remote backup metadata (if applicable). The local backup manager may request a copy of the backup metadata from one or more remote storage server(s) and/or one or more remote storage server(s) may send the remote backup metadata automatically upon completing generation of the backup metadata. Further, the local backup manager may generate association metadata and add the association metadata to the combined metadata.

In Step 316, the local backup manager copies the combined metadata to the metadata server. In one or more embodiments of the invention, the combined metadata is copied to the metadata server using one or more operative connections between the local storage server and the metadata server. The method may end following Step 316.

Figure 4:
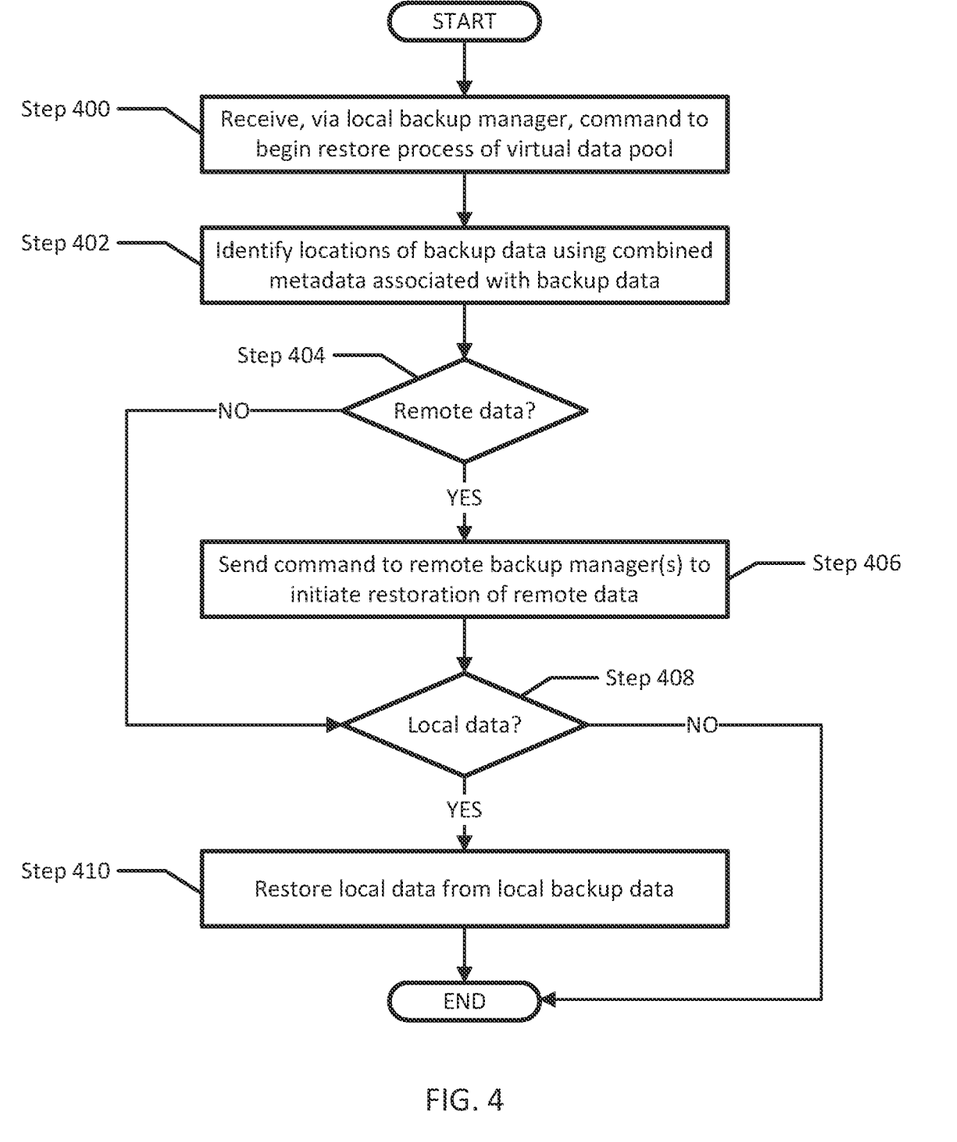
FIG. 4 shows a flowchart of a method of restoring data from backup data and backup metadata, in accordance with one or more embodiments of the invention.

FIG. 4 shows a flowchart of a method of restoring data from backup data and backup metadata, in accordance with one or more embodiments of the invention. All or a portion of the method shown may be performed by one or more components of the local storage server. However, another component of the system may perform this method without departing from the invention. While the various steps in this flowchart are presented and described sequentially, one of ordinary skill in the relevant art will appreciate that some or all of the steps may be executed in different orders, combined, or omitted, and some or all steps may be executed in parallel.

In Step 400, the local backup manager receives a command (or request) to begin restoring data from a specific backup data. In one or more embodiments of the invention, the command may be to restore individual data components as structured and referenced in a virtual data pool.

In Step 402, the local backup manager identifies the locations of the backup data using the combined metadata. The combined metadata includes one or more backup metadata from one or more respective storage server(s), on which each respective backup data will be stored. In one or more embodiments of the invention, the local backup manager retrieves the combined metadata from the metadata server.

In Step 404, the local backup manager makes a determination as to whether the combined metadata references any data stored on a remote storage server. In one or more embodiments of the invention, the local backup manager makes the determination based on whether any of the backup metadata include information indicating that the backup data is on a remote storage server (e.g., an identifier of a remote storage server, paths to remote storage, etc.). If the combined metadata includes remote backup metadata (Step 404-YES), the process proceeds to Step 406. If the combined metadata does not include remote backup metadata (Step 404-NO), the process proceeds to Step 408.

In Step 406, the local backup manager sends a command to each remote storage server (and/or the remote backup manager executing thereon) to initiate the restoration of remote data from the remote backup data. In one or more embodiments of the invention, the local backup manager sends a command to initiate restoration of a remote data to each remote storage server that was identified (in Step 404) as storing individual data components of the data to be restored. Further, the command sent to the remote storage server (and/or the remote backup manager executing thereon) may include the remote backup metadata (and/or any component thereof) specific to the backup data being restored. In response to receiving the request to initiate restoration of remote data, the remote backup manager generates the remote data from the remote backup data in a method similar to how the local storage server restores local data from local backup data (as discussed in Step 410).

In Step 408, the local backup manager makes a determination as to whether the combined metadata references any data stored on the local storage server. In one or more embodiments of the invention, the local backup manager makes the determination based on whether any of the backup metadata include information indicating that the backup data is on the local storage server (e.g., an identifier of the local storage server, paths to local storage, etc.). If the combined metadata includes local backup metadata (Step 408-YES), the process proceeds to Step 410. If the combined metadata does not include local backup metadata (Step 408-NO), the process may end.

In Step 410, the local backup manager restores local data from local backup data. In one or more embodiments of the invention, the local backup manager restores the local data by reading the local backup metadata (of the combined metadata) and modifying the local data (as it currently exists on the local storage server) to a state as it existed when the local backup data was generated. Accordingly, the local backup manager may delete local data that did not exist when the local backup data was generated. The local backup manager may overwrite local data (that was since modified) to the same local data as specified in the local backup data. Lastly, the local backup manager may recreate local data that was since deleted. One of ordinary skill in the art, having the benefit of this detailed description, would appreciate how data may be restored from a backup data.

What is claimed is:

1. A method for generating a plurality of data backups, comprising:

receiving, by a local backup manager executing on a local storage server, a command to initiate a backup process for a virtual data pool; and in response to receiving the command:
identifying, in the virtual data pool, a plurality of locations pointing to a plurality of data, respectively;
making a first determination that a first location, of the plurality of locations, points to a remote data, of the plurality of data, stored on a remote storage server;
in response to the first determination:
sending a second command, to the remote storage server, to generate a remote backup data of the remote data;
making a second determination that a second location, of the plurality of locations, points to a local data, of the plurality of data, stored on the local storage server; and
in response to the second determination:
generating a local backup data of the local data,
wherein the plurality of data backups comprises the remote backup data and the local backup data.

2. The method of claim 1, wherein in response to the second determination, the method further comprises:
generating a local backup metadata, comprising:
a first unique identifier associated with the local backup data.

3. The method of claim 2, wherein after generating the local backup metadata, the method further comprises:
receiving, from the remote storage server, a remote backup metadata, wherein the remote backup metadata comprises a second unique identifier associated with the remote backup data; and
generating a combined metadata, comprising:
combining the local backup metadata and the remote backup metadata to obtain the combined metadata.

4. The method of claim 3, generating the combined metadata further comprises:
generating an association metadata, comprising:
a third unique identifier associated with the local backup metadata; and
a fourth unique identifier associated with the remote backup metadata.

5. The method of claim 4, wherein after generating the combined metadata, the method further comprises:
sending the combined metadata to a metadata server.

6. The method of claim 1, wherein the method further comprises: making a third determination that a third location, of the plurality of locations, points to a second remote data, of the plurality of data, stored on a second remote storage server; and in response to the first determination: sending a third command, to the second remote storage server, to generate a second remote backup data of the second remote data.

7. The method of claim 1, wherein the first location is a symbolic link to the remote storage server.

8. A non-transitory computer readable medium comprising instructions which, when executed by a computer processor, enables the computer processor to perform a method for generating a plurality of data backups, comprising:
receiving, by a local backup manager executing on a local storage server, a command to initiate a backup process for a virtual data pool; and
in response to receiving the command:
identifying, in the virtual data pool, a plurality of locations pointing to a plurality of data, respectively;
making a first determination that a first location, of the plurality of locations, points to a remote data, of the plurality of data, stored on a remote storage server;
in response to the first determination:
sending a second command, to the remote storage server, to generate a remote backup data of the remote data;
making a second determination that a second location, of the plurality of locations, points to a local data, of the plurality of data, stored on the local storage server; and
in response to the second determination:
generating a local backup data of the local data,
wherein the plurality of data backups comprises the remote backup data and the local backup data.

9. The non-transitory computer readable medium of claim 8, wherein in response to the second determination, the method further comprises:
generating a local backup metadata, comprising:
a first unique identifier associated with the local backup data.

10. The non-transitory computer readable medium of claim 9, wherein after generating the local backup metadata, the method further comprises:
receiving, from the remote storage server, a remote backup metadata, wherein the remote backup metadata comprises a second unique identifier associated with the remote backup data; and
generating a combined metadata, comprising:
combining the local backup metadata and the remote backup metadata to obtain the combined metadata.

11. The non-transitory computer readable medium of claim 10, generating the combined metadata further comprises:
generating an association metadata, comprising:
a third unique identifier associated with the local backup metadata; and
a fourth unique identifier associated with the remote backup metadata.

12. The non-transitory computer readable medium of claim 11, wherein after generating the combined metadata, the method further comprises:
sending the combined metadata to a metadata server.

13. The non-transitory computer readable medium of claim 8, wherein the method further comprises: making a third determination that a third location, of the plurality of locations, points to a second remote data, of the plurality of data, stored on a second remote storage server; and in response to the first determination: sending a third command, to the second remote storage server, to generate a second remote backup data of the second remote data.

14. The non-transitory computer readable medium of claim 8, wherein the first location is a symbolic link to the remote storage server.

15. A local storage server, comprising:
a storage device storing local data;
a local backup manager; and
a processor, wherein the processor is configured to perform a method for generating a plurality of data backups, comprising:
receiving, by the local backup manager, a command to initiate a backup process for a virtual data pool; and
in response to receiving the command:
identifying, in the virtual data pool, a plurality of locations pointing to a plurality of data, respectively;
making a first determination that a first location, of the plurality of locations, points to a remote data, of the plurality of data, stored on a remote storage server;

in response to the first determination:
  sending a second command, to the remote storage server, to generate a remote backup data of the remote data;
  making a second determination that a second location, of the plurality of locations, points to a local data, of the plurality of data, stored on the local storage server; and
  in response to the second determination:
    generating a local backup data of the local data,
  wherein the plurality of data backups comprises the remote backup data and the local backup data.

16. The local storage server of claim 15, wherein in response to the second determination, the method further comprises:
  generating a local backup metadata, comprising:
    a first unique identifier associated with the local backup data.

17. The local storage server of claim 16, wherein after generating the local backup metadata, the method further comprises:
  receiving, from the remote storage server, a remote backup metadata, wherein the remote backup metadata comprises a second unique identifier associated with the remote backup data; and
  generating a combined metadata, comprising:
    combining the local backup metadata and the remote backup metadata to obtain the combined metadata.

18. The local storage server of claim 17, generating the combined metadata further comprises:
  generating an association metadata, comprising:
    a third unique identifier associated with the local backup metadata; and
    a fourth unique identifier associated with the remote backup metadata.

19. The local storage server of claim 18, wherein after generating the combined metadata, the method further comprises:
  sending the combined metadata to a metadata server.

20. The local storage server of claim 15, wherein the method further comprises:
  making a third determination that a third location, of the plurality of locations, points to a second remote data, of the plurality of data, stored on a second remote storage server; and
  in response to the first determination:
    sending a third command, to the second remote storage server, to generate a second remote backup data of the second remote data.

* * * * *